Sept. 6, 1938. A. LYSHOLM ET AL 2,129,472
IGNITION SYSTEM
Filed Nov. 23, 1935 2 Sheets-Sheet 1
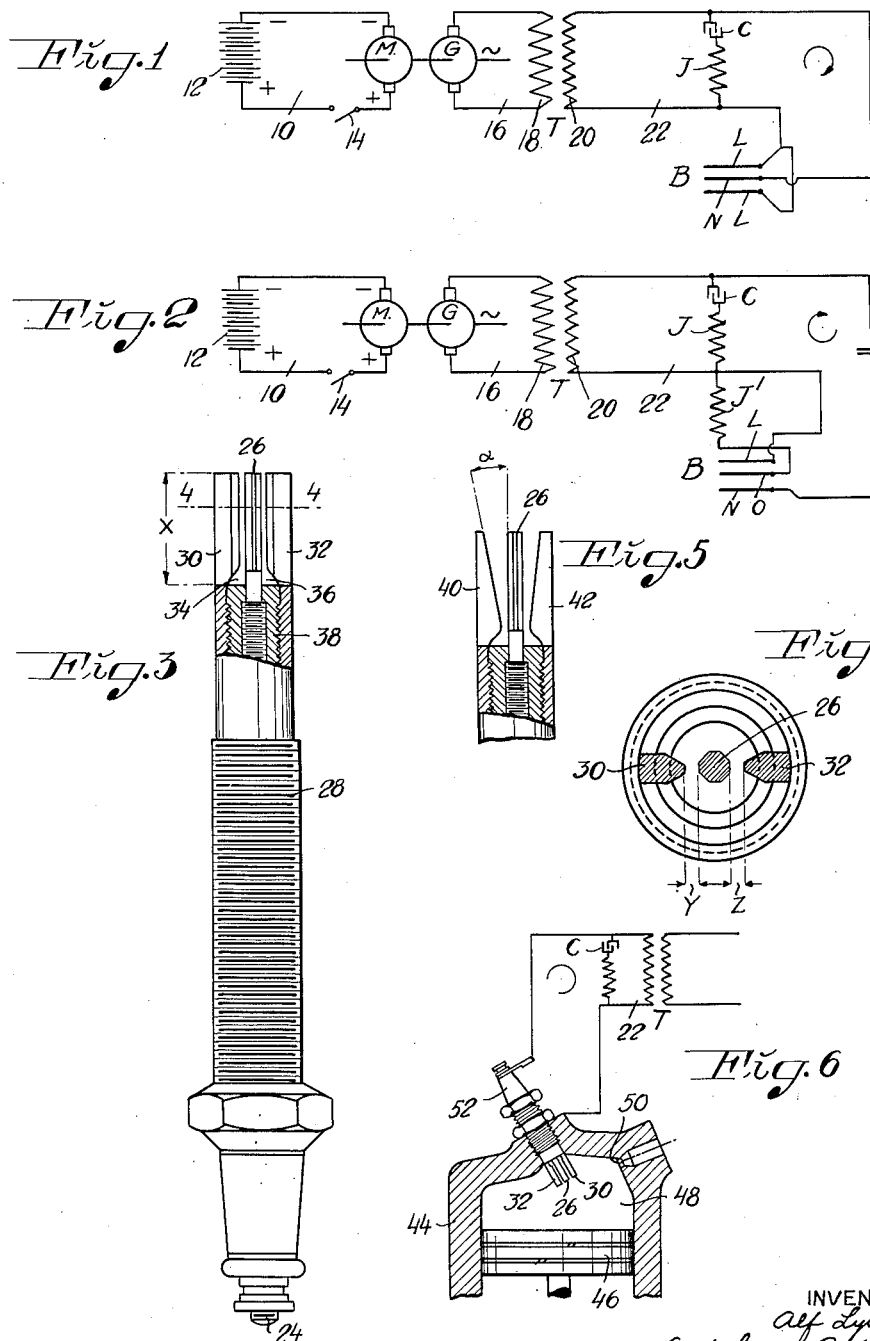
INVENTORS
Alf Lysholm
Erik Lorenz Rudolf Lysholm
BY Jarvis C. Marble
their ATTORNEY

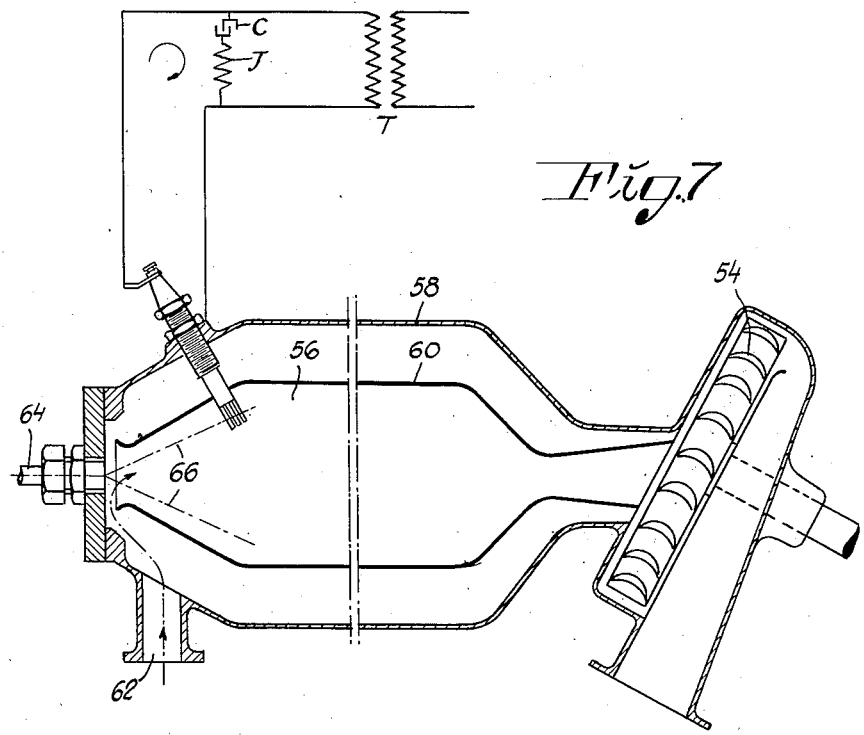
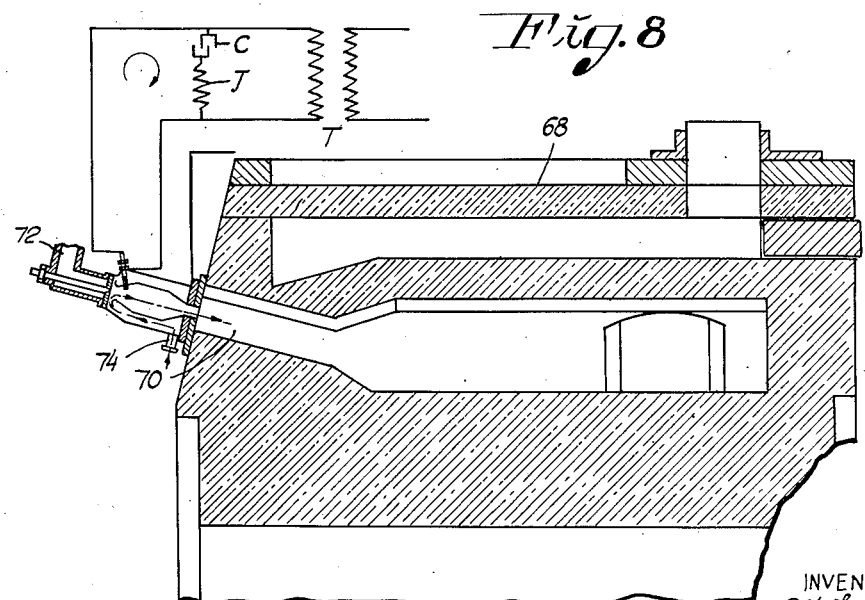

Patented Sept. 6, 1938

2,129,472

UNITED STATES PATENT OFFICE 2,129,472

IGNITION SYSTEM

Alf Lysholm and Erik Lorenz Rudolf Lysholm, Stockholm, Sweden, assignors to Aktiebolaget Milo, Stockholm, Sweden, a corporation of Sweden Application November 23, 1935, Serial No. 51,231
In Sweden November 24, 1934

3 Claims. (Cl. 123—148)

The present invention relates to ignition systems and has particular reference to high tension electrical ignition systems providing spark ignition for gaseous, pulverized or atomized liquid fuels which will hereinafter, for convenience, be referred to generically as finely divided fuels.

Among the principal objects of the invention are; to provide reliable ignition of finely divided fuels in furnaces, combustion chambers for gas turbine systems, internal combustion engines and other apparatus provided with combustion chambers in which air for combustion is mingled with such fuel to provide an ignitable charge; to provide a novel, high tension, high frequency ignition system including novel means for providing one or more spark gaps so arranged that the spark produced by the system travels in a manner providing an ignition zone of substantial extent as distinguished from a concentrated or localized point of ignition; and to provide as a new article of manufacture a novel form of spark plug adapted to produce a travelling spark when employed in ignition circuits having the electric characteristics contemplated by the invention.

According to the preferred embodiment of the invention, the spark or sparks produced for the ignition of fuel are produced by means of high frequency, high tension current of the kind ordinarily referred to as Tesla current and having a periodicity and voltage of the order of at least 100,000 cycles per second and 10,000 volts respectively. In conjunction with such current, the invention contemplates the use of means providing one or more spark gaps, the electrodes of which serve as the ignition electrodes and which are so constructed and arranged that when fed with high tension, high frequency current, a travelling or wandering spark is produced which tends to move more or less continuously back and forth along the length of the electrodes.

Stated in another way, the invention contemplates the production of an ignition zone by the provision of confronting electrodes of substantial length to which current is supplied of such nature that the spark produced between the electrodes travels along the length of the electrodes in directions generally parallel to their length and generally at a right angle to the length of the spark jumping the gap between the electrodes. In other words, it may be said that the spark travels laterally.

When a fuel air mixture is formed within a combustion chamber to be ignited therein by means of a spark or the like, it rarely happens that the ratio of fuel to air is uniform throughout the charge. This is particularly true in the case of the injection of atomized fuel oil or pulverized solid fuel into an air stream to produce a combustible charge as, for example, in furnaces or the cylinders of internal combustion engines. When, for example, fuel oil is injected by means of spray from a nozzle into a combustion chamber to which combustion air is separately supplied, the jet of atomized fuel oil is usually of decreasing ratio of oil to air from the central part or axis of the jet to the outer or enveloping surface of the jet. At or toward the center of the jet, the ratio of fuel to air is ordinarily too high to provide a readily ignitable mixture, whereas at the outer zone of the jet the ratio of fuel to oil is so low that the resultant mixture is too lean to be reliably ignitable. Furthermore, the position and direction of the jet can not always be maintained exactly stationary since the slightest impurity forming a partial clogging of the jet orifice, or the formation of carbon deposits at or near the orifice can and frequently do deflect the jet to a considerable extent. It is, therefore, very difficult to locate the position of the ordinary spark gap of an ignition system so that the spark will always occur in the zone of injection where the most readily ignitable ratio of fuel to air is formed by the injected fuel.

In accordance with one phase of the present invention, this difficulty is overcome by disposing the elongated ignition electrodes of the system generally transverse of the general direction of flow of the fuel and in a position such that the gap is disposed across a substantial transverse zone where normally the fuel-air ratio produced by injection provides the most readily ignitable mixture. By this arrangement and with the use of an ignition current in conjunction with electrodes of the kind described which results in the production of a travelling spark, reliability of ignition is insured because the transverse movement of the spark makes substantially certain the presence of the spark in the zone where the most readily ignitable mixture of fuel and air is present regardless of the variations in the position of this zone which may occur under any normal operating conditions.

For a better understanding of the nature of the various aspects of the invention and the manner in which it is carried into effect, reference may best be had to the following portion of this specification in which examples of apparatus embodying the invention are described, and to the accompanying drawings illustrative of such apparatus.

In the drawings, Fig. 1 shows diagrammatically a circuit having electrical characteristics and ignition electrodes embodying the principles of the invention;

Fig. 2 is a view similar to Fig. 1 showing a different circuit arrangement;

Fig. 3 is an elevation partly in section of a spark plug having electrodes constructed in accordance with the principles of the invention;

Fig. 4 is a section taken on the line 4—4 of Fig. 3;

Fig. 5 illustrates a slight variation in the form of electrodes shown in Fig. 4;

Fig. 6 shows the application of a system embodying the invention to the combustion chamber of an internal combustion engine of the injection type;

Fig. 7 illustrates the application of the invention to the combustion chamber of a gas turbine system; and Fig. 8 illustrates the application of the invention to the burner of a metallurgical furnace.

Referring now to Fig. 1, the system illustrated comprises a low tension, direct current circuit 10 supplied with current from a storage battery or other suitable source of supply 12 and including the motor M of a rotary converter, the alternating current generator of which is indicated at G. The usual switch for opening and closing the circuit is indicated at 14.

The generator G serves to energize the circuit 16 which includes the primary winding 18 of a Tesla coil T. The secondary winding 20 of the Tesla coil T is connected to a high frequency oscillation circuit 22 in which are included in series a condenser C, an induction coil J and a spark gap B which, in the embodiment illustrated, is in the form of a multiple gap situated between parallel elongated electrodes L and N. The electrodes L and N constitute the ignition electrodes which are placed within the combustion chamber. These electrodes serve simultaneously as discharge members for the ignition spark and as the oscillation generator for producing the high tension oscillating type of high frequency circuit. The use of a single gap or groups of gaps for both ignition sparks and oscillation generating sparks is of substantial practical advantage since it eliminates the necessity for a separate and frequently delicate oscillation generating gap. With the arrangement shown, the induction coil J may be readily mounted around the condenser C and this unit together with the transformer T mounted in a box or other container, making a simple and rugged unit.

In the system shown in Fig. 2, the circuits 10 and 16 are as described in the embodiment shown in Fig. 1, but in the present system spark gaps are formed between a central electrode O connected to the oscillation circuit through an extension $J^1$ of the induction coil J in order to produce an amplification or spreading of the spark field between the electrodes and thereby facilitate ignition.

It will be understood of course that other variations in the nature of the circuit employed may be made within the scope of the invention and that numerous different methods may be employed for suitably energizing the primary coil of the Tesla transformer. For example, one or more additional condensers such as that indicated at $C_2$ may be employed in the circuit for increasing spark intensity.

A suitable embodiment for the ignition electrodes is indicated in Figs. 3 and 4.

The electrodes are preferably arranged as a part of what is ordinarily termed a spark plug and which may be of ordinary construction except for the specific form of electrodes.

The central terminal 24 of the plug is electrically connected to a central electrode 26 while the other terminal 28 of the plug, which is ordinarily formed by the outer casing, is electrically connected with two outer electrodes 30 and 32. All three of the electrodes 26, 30 and 32 are of elongated form as shown in Fig. 3, their length indicated at X in Fig. 3 being several times greater than the distances Y and Z (Fig. 4) by which they are spaced apart. Preferably the electrodes are made of tungsten containing material or other material having comparable electrical and physical characteristics but it will be understood that any other material suitable for electrode use may be employed. At their inner ends, the electrodes 30 and 32 are advantageously undercut as indicated at 34 and 36 in Fig. 3 and from these undercut portions where the electrodes join the outer casing 28, they are insulated from the central electrode 26 and its connection to the terminal 24 by means of any suitable form of insulation indicated at 38.

While in order to produce the desired travelling characteristics of the spark along the length of the electrodes, we have found it to be generally preferable to have the confronting portions of the electrodes forming the gap or gaps parallel, we have found that it is not essential to have such confronting portions in absolute parallelism in order to obtain the desired result. We have found that the electrodes, particularly if the confronting portions thereof are tapered so as to present confronting edges may be divergent to the extent of as much as 10 degrees or so without adversely affecting the travelling characteristics of the spark to any material extent.

In Fig. 5, we have shown a plug arrangement in which the outer electrodes 40 and 42 are shown with somewhat exaggerated taper to indicate the divergent angle alpha which may be employed. In all cases, however, the length of the electrodes is several times the width of the gap and for purposes of setting forth the invention, we will hereinafter refer to the electrodes as being substantially parallel with the intention of generically including both the forms of construction shown in Figs. 4 and 5.

While the reason or reasons for the phenomenon of the travelling spark produced by the above described kinds of apparatus is not precisely known to us, we believe that the movement of the spark back and forth along the length of the electrodes is probably caused by the variations in the ionization of the air gap produced by the high tension, high frequency spark and further believe that variations in surface resistance of the electrodes may also be a contributing factor. In any event, we have definitely established that substantially continuous lateral movement of a high tension, high frequency spark is produced when it is formed between electrodes arranged as above described and that the factors causing the travelling movement of the spark are sufficiently strong so that such movement is effected even though the electrodes are not in exact parallelism and provide a gap of varying width along the length of the electrodes.

While for purposes of illustration, we have shown only one arrangement in Figs. 3 to 5 with respect to the number of electrodes employed, it will be understood that other specific forms of electrode arrangement may be employed within the scope of the invention so long as the electrodes are arranged to provide a gap or gaps having the relation of length to width of gap required for the production of the travelling spark which is characteristic of the invention.

Referring now to Fig. 6, the application to an internal combustion engine of apparatus embodying the invention is shown in more or less diagrammatic fashion.

In the apparatus shown, the engine cylinder is indicated at 44 and the piston at 46. The combustion chamber is indicated at 48. Air for combustion is admitted to the combustion chamber 48 in any desired manner, either through ports in the cylinder wall or through suitable valves (not shown). Atomized fuel either with or without an additional air charge is sprayed into the combustion chamber by means of the injection nozzle indicated generally at 50 and the plug 52 is inserted in the cylinder with the electrodes 26, 30 and 32, which advantageously are of the form shown in Figs. 4 and 5, arranged with their length generally transverse of the general direction of movement of the injected fuel spray.

The plug 52, for purposes of illustration, is shown as being connected into a high frequency oscillation circuit of the kind indicated at 22 in Fig. 1 and it will be understood that the spark circuit arrangement may be varied.

In some forms of injection engines, precise timing of the ignition of the injected charge is not determined by the timing of the spark but by the timing of the period of injection. For an ignition system of this sort, a continuous spark could be employed but even with an ignition system of this sort, it is generally desirable to provide some sort of interrupter to avoid useless current waste during compression and scavenging periods of the engine cycle of operation. It will further be understood that where the invention is applied to engines depending upon timing of the spark for establishing the proper timing of ignition and for multicylinder engines, suitable primary circuit interrupting means and high tension current distributing means of known character may be included within the electrical circuits.

As will be evident from Fig. 6, the arrangement of the electrodes with relation to the direction of movement of the injected fuel, will result in the production of an ignition zone of substantial width transversely of the direction of movement of the fuel, so that reliable ignition of the charge will be insured despite variations in the distance from the axis of the jet of the zone where the most readily ignitable mixture of fuel and air exists at any given moment.

Fig. 7 illustrates another application of the invention to a continuous combustion gas turbine system which has been illustrated in diagrammatic fashion. In this figure, the gas turbine is indicated at 54 and the combustion chamber at 56. In the particular embodiment illustrated, the combustion chamber comprises an outer casing 58 and an inner casing 60. Air is admitted to the interior of the inner casing 60 and to the space between the two casings through the inlet connection 62 and fuel is supplied through pipe 64 and a suitable injection nozzle so as to flow into the combustion chamber in the form of a conical spray roughly defined by the lines 66. In this arrangement, as in the arrangement shown in Fig. 6, the location of the spark plug electrodes is such that the travelling spark moves in a direction generally transverse to the direction of movement of the injected fuel so as to move through zones of varying fuel density in the region where the fuel air ratio of most favorable proportions is normally present.

Fig. 8 illustrates the application of the invention to a metallurgical furnace designated generally at 68 and having a burner providing a combustion chamber 70 to which air is supplied through the inlet 72 and to which fuel is supplied through the fuel nozzle 74. As in the previously described embodiments, the plug is arranged with the electrodes extending generally transversely of the direction of fuel flow so as to provide an ignition zone along the length of the electrodes and disposed transversely of the path of flow of the fuel so as to insure the presence of a spark at a place where the fuel air ratio provides a readily ignitable mixture.

While in compliance with the patent statutes, we have described what we consider to be the best form of apparatus for carrying the invention into effect, it will be understood that many variations in the apparatus shown may be made without departing from the spirit or scope of the invention and that certain features of the invention may be used to the exclusion of others. Also certain features of the invention may be employed with apparatus other than that shown. As for example the spark plug apparatus described may be employed within the scope of the invention with high tension, high frequency alternating currents of other type than Tesla currents or with high frequency pulsating direct currents.

Further, for the purpose described the alternating current in the Tesla primary circuit may be produced by other means than the motor-generator shown.

We claim:

1. The combination with apparatus of the kind in which finely divided fuel is mingled with combustion air with movement of the fuel in a given general direction, of means for igniting the resultant fuel air mixture including a spark plug having elongated electrodes disposed generally transversely of said given general direction of movement and having a length several times the width of the gap between the electrodes, said electrodes having spaced, confronting portions arranged substantially parallel to each other, and electrical means supplying to said electrodes a high tension, high frequency current for producing a spark travelling lengthwise of the electrodes and generally laterally of said given direction of movement of the fuel.

2. The combination with apparatus of the kind in which finely divided fuel is mingled with combustion air with movement of the fuel in a given general direction, of means for igniting the resultant fuel air mixture including a spark plug having elongated electrodes disposed generally transversely of said given general direction of movement and having a length several times the width of the gap between the electrodes, said electrodes having spaced, confronting portions arranged substantially parallel to each other, and electrical means including a high tension, high frequency oscillation circuit including said electrodes and in which said electrodes act as the oscillation generator, for producing a travelling ignition spark between the electrodes.

3. The combination with apparatus including a combustion chamber to which combustion air is admitted and into which a jet of atomized liquid fuel is injected, of means for igniting the resultant fuel air mixture including a high tension, high frequency circuit and a spark plug in said circuit located in the zone in which the atomized fuel is injected, said plug comprising elongated electrodes having substantially parallel confronting portions arranged generally transversely of the path of travel of the fuel in said jet, whereby to produce a spark in said zone travelling generally laterally of the direction of said jet along the gap provided by said electrodes.

ALF LYSHOLM.
ERIK LORENZ RUDOLF LYSHOLM.